(12) United States Patent
Inbar

(10) Patent No.: US 6,777,701 B1
(45) Date of Patent: Aug. 17, 2004

(54) THERMAL RADIATION MARKER

(75) Inventor: Eran Inbar, Tel Aviv (IL)

(73) Assignee: V-Gen Ltd., Tel Aviv (IL)

( * ) Notice: Subject to any disclaimer, the term of this patent is extended or adjusted under 35 U.S.C. 154(b) by 189 days.

(21) Appl. No.: 09/716,704

(22) Filed: Nov. 20, 2000

(51) Int. Cl.[7] .............................. G01J 1/00; G08B 8/00; G08B 5/00

(52) U.S. Cl. .............................. 250/504 R; 250/493.1; 250/495.1; 116/7; 116/20; 116/29; 116/30; 116/42; 116/43; 116/45; 116/46; 116/202; 116/209; 116/306; 116/309

(58) Field of Search ........................ 250/504 R, 505 R, 250/493.1, 495.1; 116/7, 20, 29, 30, 42, 43, 45, 46, 202, 209, 306, 309; 359/237, 238, 242, 247, 275, 276; 340/321, 331, 332, 946, 950, 953, 956, 955, 981–983; 362/35, 296, 362, 467, 470, 475, 476, 486, 487, 493, 508, 512, 514, 516, 540, 542, 546–549, 800

(56) References Cited

U.S. PATENT DOCUMENTS

| | | | |
|---|---|---|---|
| 4,346,343 A | * | 8/1982 | Berndlmaier et al. ....... 323/282 |
| 4,430,597 A | * | 2/1984 | Thompson ................... 313/113 |
| 4,476,530 A | * | 10/1984 | Pannier et al. ................ 701/62 |
| 4,491,900 A | * | 1/1985 | Savage, Jr. .................. 362/230 |
| 4,559,529 A | * | 12/1985 | Bernhardt .................... 340/571 |
| 4,912,334 A | | 3/1990 | Anderson ................ 250/495.1 |
| 5,007,689 A | * | 4/1991 | Kelly et al. .................. 359/350 |
| 5,122,424 A | * | 6/1992 | Chaffin, III ................. 428/697 |
| 5,225,828 A | | 7/1993 | Walleston .................... 340/953 |
| 5,351,037 A | * | 9/1994 | Martell et al. ............... 340/632 |
| 5,414,405 A | | 5/1995 | Hogg et al. .................. 340/321 |
| 5,422,783 A | * | 6/1995 | Darbee ........................ 361/680 |
| 5,438,233 A | * | 8/1995 | Boland et al. ............... 313/110 |
| 5,510,186 A | * | 4/1996 | Sulzbach ..................... 428/408 |
| 5,661,774 A | * | 8/1997 | Gordon et al. ............... 378/101 |
| 5,804,829 A | | 9/1998 | Palmer ........................ 250/504 |
| 5,864,144 A | * | 1/1999 | Laine ...................... 250/504 R |
| 5,939,726 A | | 8/1999 | Wood ..................... 250/504 R |
| 6,011,493 A | * | 1/2000 | Bushell et al. ............... 340/981 |
| 6,016,245 A | * | 1/2000 | Ross ............................ 361/86 |
| 6,099,148 A | * | 8/2000 | Northrup et al. ............ 362/336 |
| 6,271,533 B1 | * | 8/2001 | O'Brien .................. 250/504 H |

* cited by examiner

Primary Examiner—John R. Lee
Assistant Examiner—Bernard Souw
(74) Attorney, Agent, or Firm—Merchant & Gould, P.C.

(57) ABSTRACT

Emitter controller including a controller, and a power amplifier, the controller being connected to a power source, the power amplifier being connected to the controller, the power source and to an emitter, the controller providing a pulse sequence to the power amplifier for operating the emitter, the controller determining the pulse sequence according to an available power voltage level.

37 Claims, 8 Drawing Sheets

THERMAL RADIATION MARKER

FIELD OF THE INVENTION

The present invention relates to methods and systems for producing thermal beacons in general, and to methods and systems for producing thermal marking signals, in particular.

BACKGROUND OF THE INVENTION

Methods and devices for indicating the presence of an object in darkness (e.g., where darkness is defined as being outside the range of wavelengths invisible to the human eye) are known in the art. Infrared Radiation (IR) and Near Infrared Radiation (NIR) sources (beacons), mainly in the range of 0.7–1 micron are used in various applications as identification devices, for persons and vehicles. Near infrared light can be detected by special equipment which can translate the detected infra red image to a visible one. Different types of infrared beacons are known for use in covert security operations at night, where there is a need to be able to identify friend from foe or criminals from the police, animal watching, and the like.

These infrared beacons generally operate in the near IR range, and can be detected by image intensifiers, night vision goggles, black and white cameras, and the like. Black body Infrared beacons operating in the thermal region, such as mid-IR (3–5 micron) and long-IR (8–12 micron) are less prevalent. These infrared beacons generally employ a black body element, which is heated to a high temperature, and emits IR radiation in the thermal region. The blinking feature of the beacon is achieved by constantly rotating the black body element, or mechanically chopping the emitted radiation. Black body Infrared beacons can be detected by thermal cameras.

U.S. Pat. No. 4,912,224 to Andersen, entitled "Infrared aircraft beacon light", is directed to a near infrared aircraft lighting system for use on the exterior of aircraft in combination with an existing visible light beacon. The device includes a ring structure containing infrared source that is installed between a visible light beacon and the aircraft outer surface. The device enables pilots with night vision goggles to fly in formation, and see other aircrafts, which fly in their vicinity.

U.S. Pat. No. 5,804,829 to Palmer et al., entitled "Programmable infrared signal beacon", is directed to a near infrared signal beacon, which provides a visual location signal during poor light conditions. The device can be programmed to signal at least one of a plurality of coded messages, either in the visible light range of spectrum, or in the infrared range of the spectrum. The user of the beacon can select which of the plurality of flashing sequences will be transmitted by the light sources.

U.S. Pat. No. 5,225,828 to Walleston et al., entitled "Infrared identification beacon", is directed to a device for alerting friendly personnel on land, sea or air. The beacon includes at least one near infrared light emitting diode and a visible light emitting diode, providing overlap conductive pole emanation of the NIR and visible light beams. The device can be steady or pulsed.

U.S. Pat. No. 5,414,405 to Hogg et al., entitled "Personnel identification device", is directed to a device including a NIR LED contained within a housing. The device is adapted to be carried externally by a person or an object, such as vehicles, and enables, for example, to distinguish friend from foe in dark conditions. The housing possesses a "stick-on" capability, for example a Velcro or flexible magnetic strip on a base portion. The device is preferably adapted to flash, which enables the use of coded sequences of flashes.

U.S. Pat. No. 5,939,726 to Wood et al., entitled "Infrared radiation source", is directed to a pulsable IR radiation source, which is intended for use in non-dispersive infrared gas analyzers. The device includes an emitting element, which is made of a narrow strip of foil. The emitting element is located in the hermetically sealed metal package with inert gas, such as nitrogen, helium or a combination thereof. The foil is heated by applying electrical power. The IR source provides high efficiency radiation at infrared wavelengths, and operates in the range of 1–3 Watts of power. The IR source cannot operate at high levels of power such as 10 Watts or more.

SUMMARY OF THE PRESENT INVENTION

It is an object of the present invention to provide a method and a system for emitting pulsed infra red radiation, which overcomes the disadvantages of the prior art.

In accordance with the present invention, there is thus provided an emitter controller including a controller, and a power amplifier. The controller is connected to a power source. The power amplifier is connected to the controller, the power source and to an emitter. The controller provides a pulse sequence to the power amplifier for operating the emitter, and the controller determines the pulse sequence according to an available power voltage level.

In accordance with another aspect of the present invention, there is thus provided a method for operating an emitter controller. The method includes the steps of detecting a voltage level of a power signal, determining a heating time period, and producing a pulse signal. The power signal is provided to the emitter. The heating time period is determined according to the detected voltage level, and a target heating temperature. The pulse signal is produced according to the heating time period, for operating the power amplifier at the detected voltage level.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

The present invention overcomes the disadvantages of the prior art by providing a clear beacon blinking mechanism (black/white i.e., hot/cold) which blinks at a frequency of from a few part of Hz to several Hz. A blinking frequency in the range of 1–2 Hz was found by the inventor to be optimal, from an ergonomic (human factor engineering) point of view.

Figure 1:
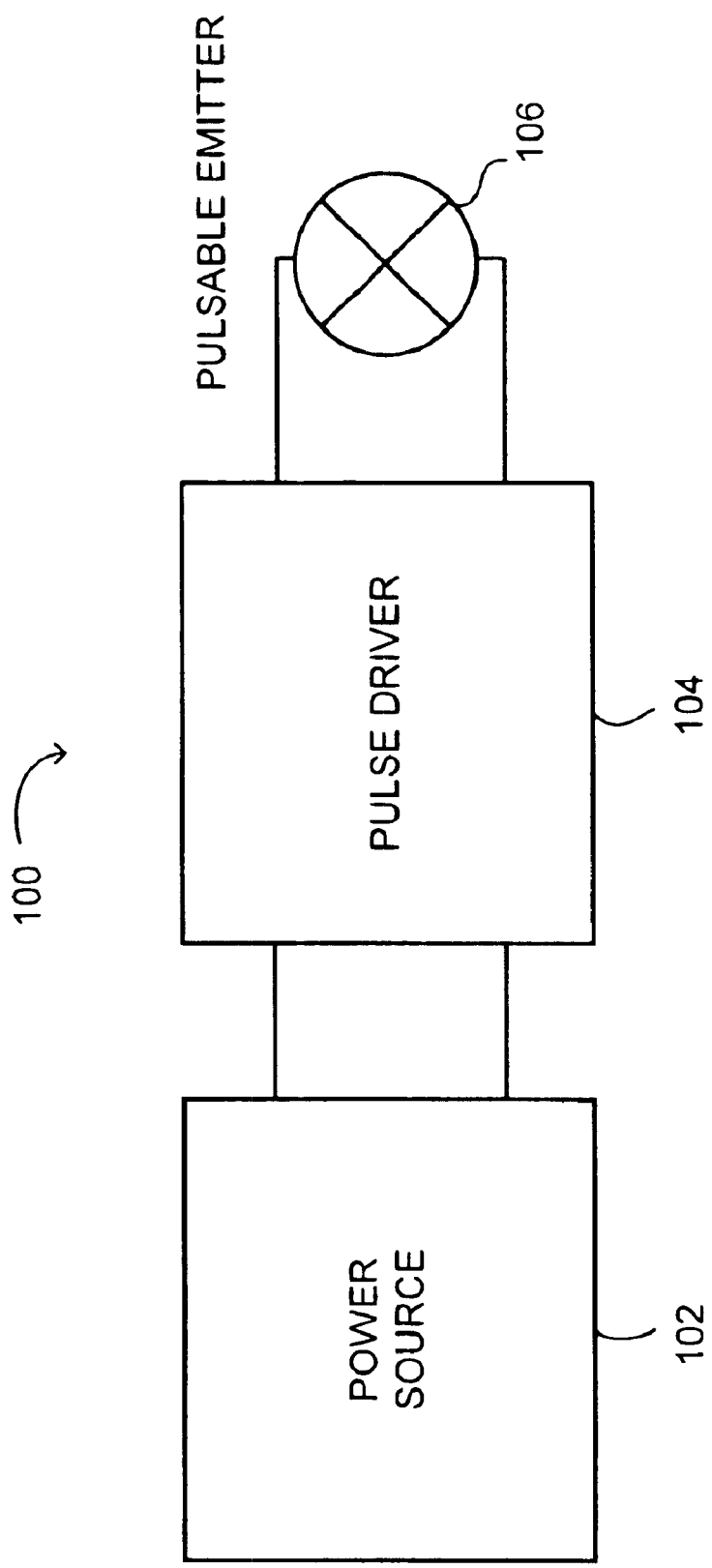
FIG. 1 is a schematic illustration of an apparatus, constructed and operative in accordance with a preferred embodiment of the present invention.

Reference is now made to FIG. 1, which is a schematic illustration of an apparatus, generally referenced 100, constructed and operative in accordance with a preferred embodiment of the present invention. Apparatus 100 includes a power source 102, a pulse driver 104 and a pulsable infrared emitter 106. Pulse driver 104 is connected to power source 102 and to pulsable infrared emitter 106.

Figure 2:
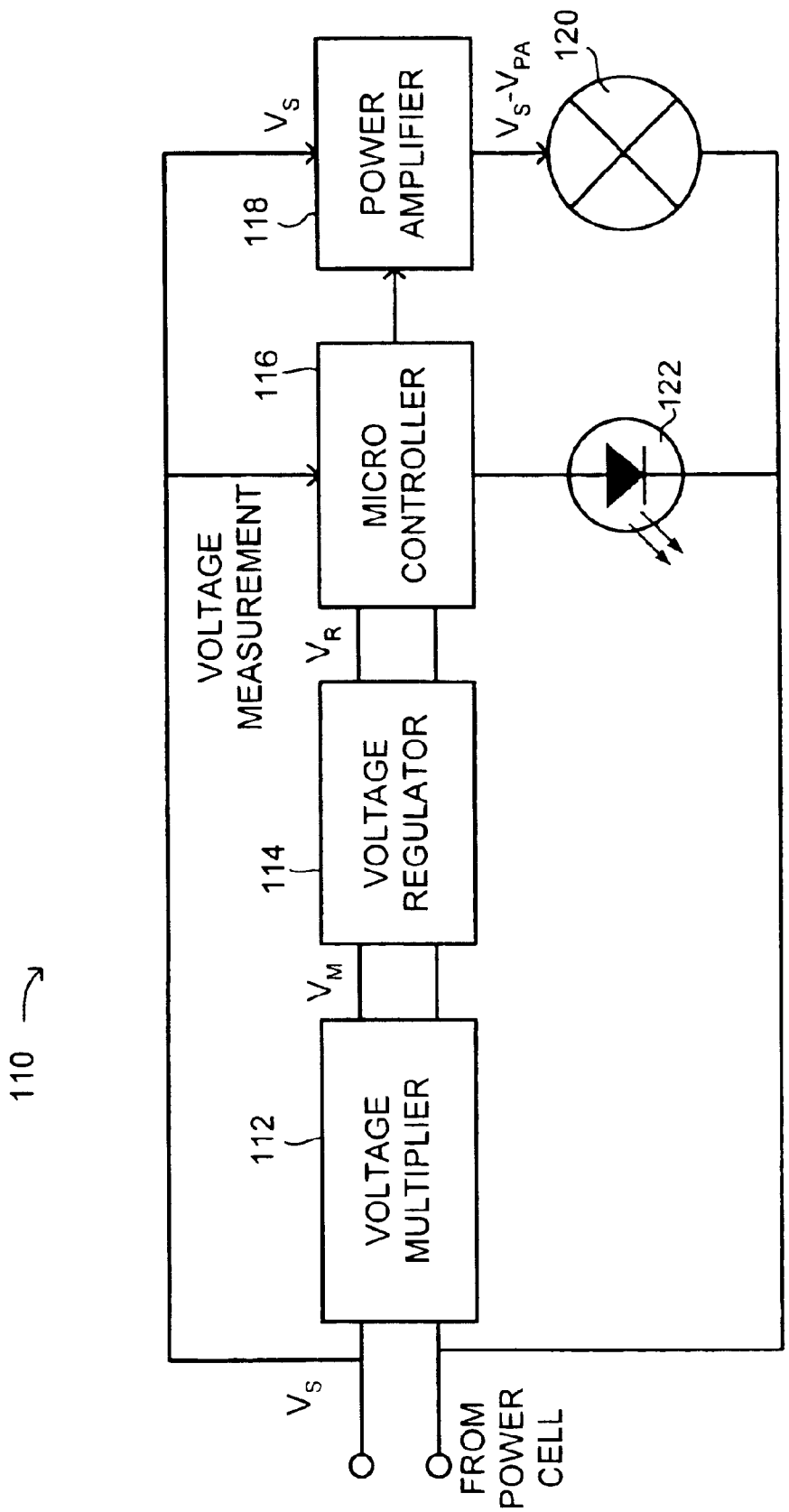
FIG. 2 is a schematic illustration of an apparatus, constructed and operative in accordance with another preferred embodiment of the present invention.

Power source 102 can either produce alternating or direct electrical power. Power source 102 provides the electrical power to pulse driver 104. Pulse driver 104 produces a predetermined periodic electrical pulse, and provides the periodic electrical pulse to pulsable infrared emitter 106. The periodic electrical pulses periodically heat pulsable infrared emitter 106, thereby producing periodic thermal radiation. Hence, apparatus 100 blinks at thermal IR wavelengths (which are mid-IR and long-IR, at ranges of 3–5 and 8–12 microns, respectively). Reference is now made to FIG. 2, which is a schematic illustration of an apparatus, generally referenced 110, constructed and operative in accordance with another preferred embodiment of the present invention. Apparatus 110 includes a voltage multiplier 112, a voltage regulator 114, a micro-controller 116, a power amplifier 118, an infra red emitter 120 and an indicator 122. Voltage regulator 114 is connected to voltage multiplier 112 and micro-controller 116. Voltage multiplier 112 is further connected to a power cell (not shown). Micro-controller 116 is further connected to power amplifier 118, to the power cell, and to indicator 122. Power amplifier 118 is further connected to the power cell, and to infra red emitter 120. Infra red emitter 120, and indicator 122 are further connected to the power cell.

The power cell provides voltage $V_S$ to voltage multiplier 112. Voltage multiplier 112 multiplies the voltage $V_S$ by a factor of more than one, and provides voltage $V_M$ to voltage regulator 114. Voltage regulator 114 produces a constant, regulated voltage level $V_R$ and provides it to micro controller 116.

A conventional power cell is characterized by a diminishing voltage curve as it is drained further and further. Therefore, it is likely that the voltage will drop below a predetermined minimal level $V_{min}$, while the power cell still has enough power to drive the apparatus for an additional period of time. The combination of voltage multiplier 112 and voltage regulator 114 provides a constant regulated operating voltage to micro-controller 116, even after $V_S$ has dropped below $V_{min}$.

Micro-controller 116 measures $V_S$ and dynamically determines the characteristics of the next pulse. It is noted that micro-controller 116 can use $V_R$ as a reference in the measurement of $V_S$.

The infra red emitter 120 has to be heated to a predetermined temperature in order to be detected by a thermal camera. In general, the power amplifier 118 has to provide a certain amount of energy E to infra red emitter 120 for this purpose. Higher amounts of energy might damage the infra red emitter 120, or prevent rapid cooling thereof. Lower amounts of energy might not heat infrared emitter 120 to temperatures high enough for the thermal camera to detect infrared emitter 120.

It is noted that the energy supplied by the power cell, is proportional to the heating time period $T_H$ and the applied voltage $V_S-V_{PA}$, where $V_{PA}$ denotes the voltage across the power amplifier 118. Since $V_{PA}$ is substantially constant, E is substantially and directly proportional to $V_S$. Hence, for providing a certain amount of energy, one would require a longer heating time at low $V_S$ levels, and a shorter heating time at high $V_S$ levels.

The amount of energy required for heating infra red emitter 120 to this temperature may depend on the heat dissipation characteristics of infra red emitter 120. The micro-controller 116 adds respective considerations when heat dissipation is significant.

Micro-controller 116 determines a pulse, operates power amplifier 118 to produce such a pulse, and provides the pulse to infra red emitter 120. Indicator 122 can be operated to provide an indication signal, respective of the operation of the emitter, an indication of the mode which the apparatus currently operates, and the like. The indication signal can be visual, audible, and the like.

Apparatus 110 further includes power management means, which maintain a stable mode of operation as well as providing protection against undesired discharge of the power cell, where one is used.

When micro-controller 116 detects that $V_S$ has dropped below a predetermined threshold $V_{THRESHOLD}$, it can execute a cut-off procedure. The cut-off procedure shuts down apparatus 110, thereby reducing potential damage thereto. Such a damage can be caused by a complete discharge of the power cell, which is exceptionally significant for Lithium-ion power cells.

Figure 3:
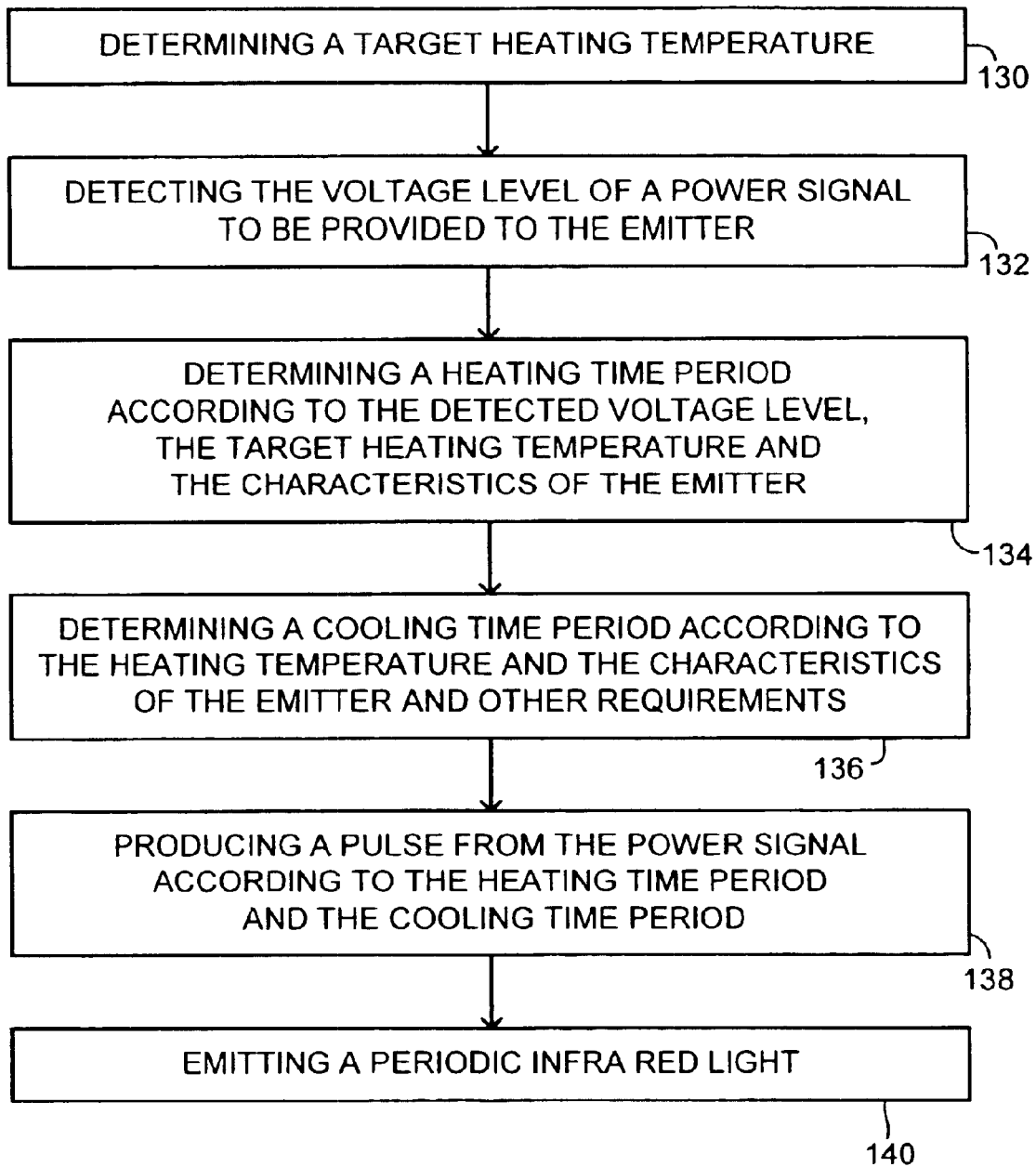
FIG. 3 is a schematic illustration of a method for operating the system of FIG. 2, operative in accordance with a further preferred embodiment of the present invention.

Reference is further made to FIG. 3, which is a schematic illustration of a method for operating the system 110 of FIG. 2, operative in accordance with a further preferred embodiment of the present invention.

In step 130, a heating temperature to which the emitting element of the emitter has to be heated, is determined. The heating temperature is determined according to the required wavelengths. Accordingly, the determination procedure can also take into account particular characteristics of the emitter. With reference to FIG. 2, micro-controller 116 determines the heating temperature. It is noted that this temperature can further be predetermined and stored in a memory section within micro-controller 116, or set manually.

In step 132, the voltage level of the power signal, which will be used for heating, is detected. With reference to FIG. 2, micro-controller 116 detects the voltage level $V_S$ of the power cell, and reduces environmental effects such as the voltage gap across power amplifier 118, and the like, thereby fixing the voltage level $V_S-V_{PA}$ of the power signal.

In step 134, a heating time period $T_H$ is determined. This time period is determined according to the detected power signal voltage level $V_S-V_{PA}$, the target heating temperature, and the characteristics of the infra red emitter 120, such as power efficiency, heat capacitance, power yield, and the like. It is noted that the target temperature can be maintained for a predetermined period of time, by applying a respective voltage level lower than the power signal voltage level $V_S$-$V_{PA}$.

In step 136, a cooling time period $T_C$ is determined according to the target heating temperature, the characteristics of the emitter and other requirements. The cooling time period determines the next point in time, where a new heating-cooling cycle can commence. With reference to FIG. 2, both steps 134 and 136 are performed by microcontroller 116.

In step 138, a pulse is produced from the power signal according to the heating time period and the cooling time period. With reference to FIG. 2, power amplifier 118 produces a power signal pulse of $V_S$ for $T_H$, and $V_C$ for $T_C$, where $V_C$ can be zero.

In step 140, a periodic infra red light is emitted. With reference to FIG. 2, infra red emitter 120, heated to the target heating temperature, emits a short pulse of light and cools down. It is noted that this method can be generalized for complex sequences, produced by a plurality of emitters in many modes, as will be described herein below.

Figure 4:
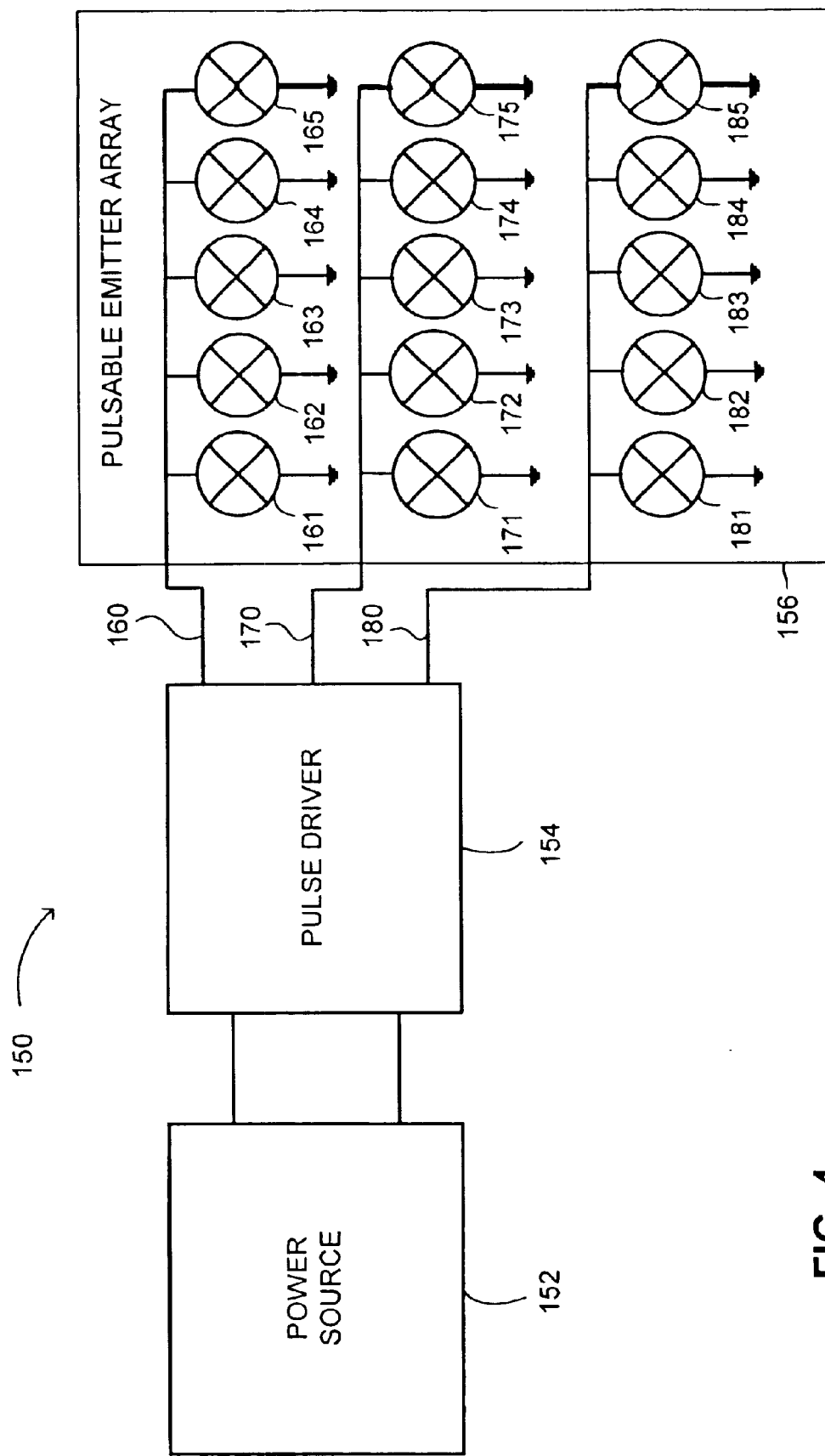
FIG. 4 is schematic illustration of a system, constructed and operative in accordance with another preferred embodiment of the present invention.

Reference is now made to FIG. 4, which is schematic illustration of a system, generally referenced 150, constructed and operative in accordance with another preferred embodiment of the present invention. System 150 includes a power source 152, a pulse driver 154 and a pulsable emitter array 156. Pulse driver 154 is coupled to power source 152 and to pulsable emitter array 156.

Pulsable emitter array 156 includes a plurality of pulsable emitters 161, 162, 163, 164, 165, 171, 172, 173, 174, 175, 181, 182, 183, 184 and 185. Pulsable emitters 161, 162, 163, 164 and 165 are coupled parallel to each other and form a group 160. Pulsable emitters 171, 172, 173, 174 and 175 are coupled parallel to each other and form a group 170. Pulsable emitters 181, 182, 183, 184 and 185 are coupled parallel to each other and form a group 180. Groups 160, 170 and 180 are coupled to pulse driver 154. It is noted that pulsable emitter array 156 can include any number of groups, and each group can include any number of pulsable emitters.

Power source 152 provides electrical power to pulse driver 154. Pulse driver 154 produces a predetermined set of repetitive electrical pulses and provides them to pulsable emitter array 156. Pulse driver 154 can operate pulsable emitter array 156 in three different modes: a simultaneous mode, a synchronous mode and a combination of simultaneous and synchronous modes.

In the simultaneous mode, the system provides the same pulse to each of groups 160, 170 and 180, which in turn produce periodic infrared radiation at the same time. In the synchronous mode, the system provides a different pulse to each of groups 160, 170 and 180, which in turn produce periodic infrared radiation one after the other.

Figure 5:
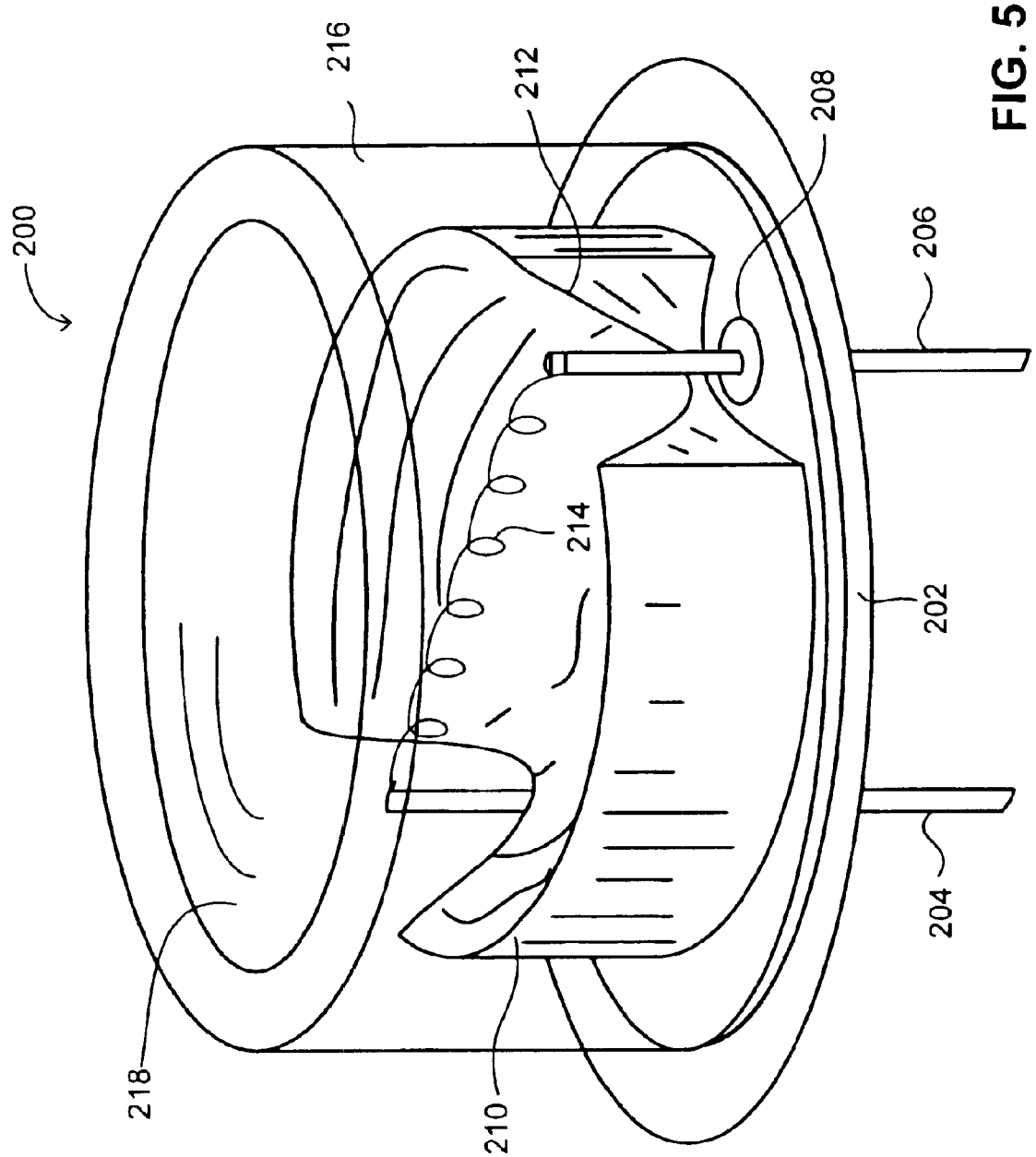
FIG. 5 is a schematic illustration of an infrared radiation emitter, constructed and operative in accordance with a further preferred embodiment of the present invention.

Reference is now made to FIG. 5, which is a schematic illustration of an infrared radiation emitter, generally referenced 200, constructed and operative in accordance with a further preferred embodiment of the present invention. Infrared radiation emitter 200 includes a mounting package 202 with two conductive poles 204 and 206, feed-through seals 208, a reflector 210 with cutouts 212 and an emitting element 214. Infrared radiation emitter 200 further includes a sealing case 216, which incorporates a window 218.

Window 218 can be made of a material, which is transparent to mid Infrared radiation (3–5 micron), and long infrared radiation (8–12 micron). Window 218 can be made of germanium, zinc-selenide, silicon, and the like. Window 218 can be constructed as a lens, for further directing the emitted light in predetermined directions. Hence, the material from which window 218 is made of, filters out light in undesired wavelengths.

Reflector 210 reflects the infrared radiation produced by emitting element 214. Reflector 210 can be parabolic, elliptic or planar. In the example set forth in FIG. 5, reflector 210 has a parabolic shape. Reflector 210 can be made of aluminum, coated with a reflective materials such as gold and silver. Conductive poles 204 and 206 provide electrical connection as well as structural rigidity to emitting element 214. Emitting element 214 can be welded to conductive poles 204 and 206.

Emitting element 214 is made of a wire with a diameter, approximately in the range of 0.003" and 0.030". It is noted that a wire having a diameter close to 0.003" will be weaker than a wire having a larger diameter. Alternatively, a wire having a diameter close to 0.030" will have a slow response to heating, and hence exhibit a low modulation is depth.

In the example set forth in FIG. 5, emitting element 214 is a coil made of 0.010" diameter wire having 10–11 rolls (windings). It is noted that the coil can have between 4 and 20 rolls and more. The diameter of each roll can be in the range approximately between 0.040" and 0.150". The gap between every two rolls can be in the range of approximately 0.003" and 0.040". Accordingly, in the example shown in FIG. 5, each roll has a diameter of 0.085" and the gap between every two rolls is 0.010". Hence, emitting element 214 has a high mechanical strength, and a high power electrical pulse can heat emitting element 214 to up to 1500 degrees Celsius.

It is noted that emitting element 214 can be a wire devoid of any rolls. In this case, system 200 operates at a lower radiation efficiency, because the effective area of radiation is smaller than that of an emitting element having rolls.

Figure 6:
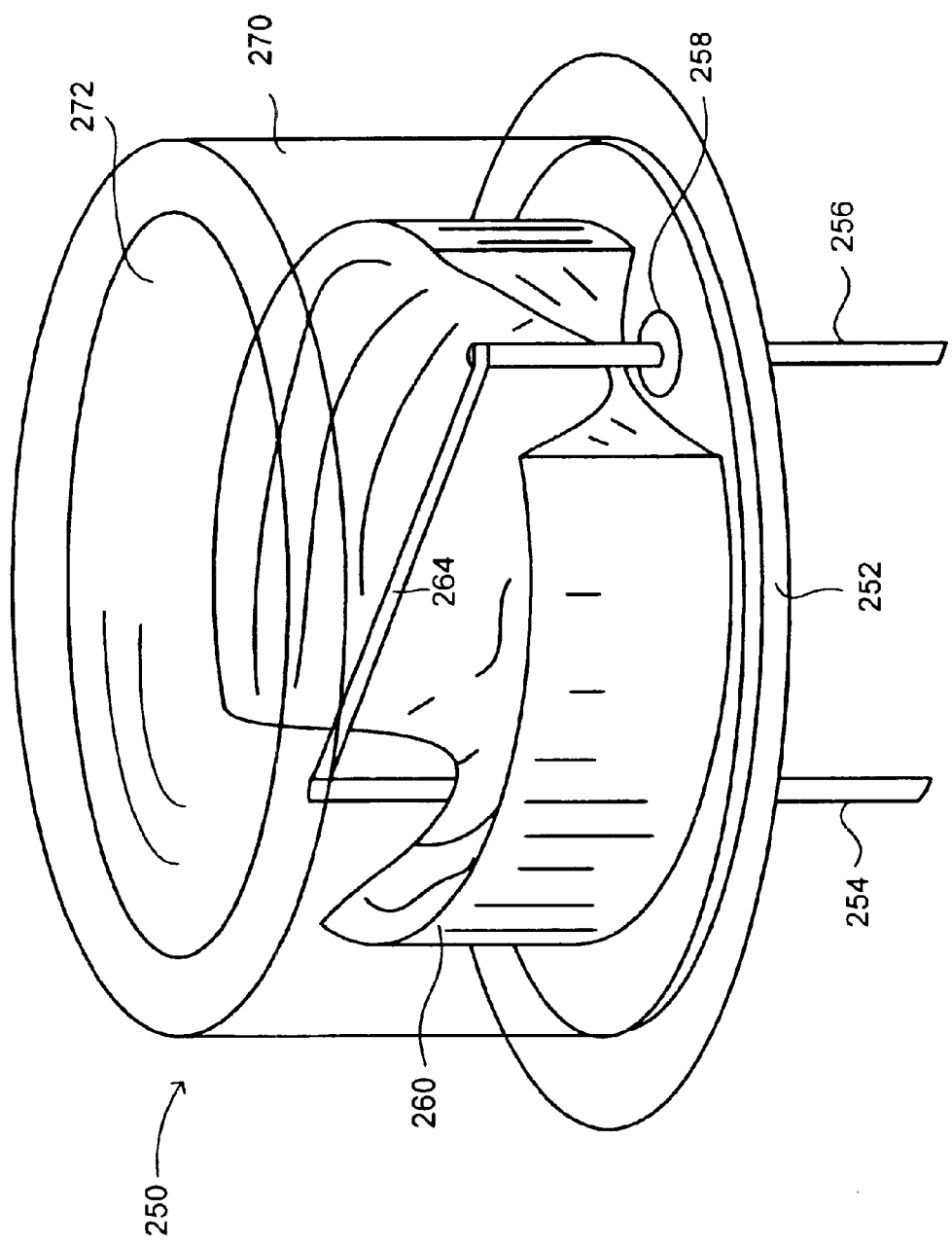
FIG. 6 is a schematic illustration of a high power infrared radiation emitter, constructed and operative in accordance with another preferred embodiment of the present invention.

Reference is now made to FIG. 6, which is a schematic illustration of a high power infrared radiation emitter, generally referenced 250, constructed and operative in accordance with another preferred embodiment of the present invention. Infrared radiation emitter 250 includes a mounting platform 252, with two conductive poles 254 and 256, insulating seals 258, a reflector 260 and an emitting element 264. Reflective 260 can be parabolic, elliptic, plane, and the like. Emitter 250 further includes a sealing case 270, which incorporates a window 272. Window 272 is analogous to window 218 as described herein above in connection with FIG. 5.

Emitting element 264 is made of a filament wire in the shape of a narrow strip of foil, having a length of approximately 0.40". It is noted, that for high power applications, a strip of foil, having a length close to 0.80" would be structurally too weak and will have a significantly reduced life span. Alternatively, the emitting area of a strip of foil, having a length less than 0.20" would be too small.

Accordingly, the strip of foil has a width, which can be in the range of approximate 0.020" and 0.060" and can have a thickness, in the range of approximately 0.00020" and 0.00060". It is noted, that a strip of foil having a thickness close to 0.00020" can not handle power inputs of more than 2 Watts. Alternatively, the strip of foil having a thickness of more than 0.00060" does not allow pulse operation in a high modulation rate.

In the example set forth in FIG. 6, emitting element 264 is a narrow strip of thin metallic nichrome foil having a width of 0.040" and a thickness of 0.00050". This design of emitting element 264 can operate at power levels of 10 Watts. It is noted that other alloys with similar characteristics can also be used, depending on the required implementation.

Figure 7A:
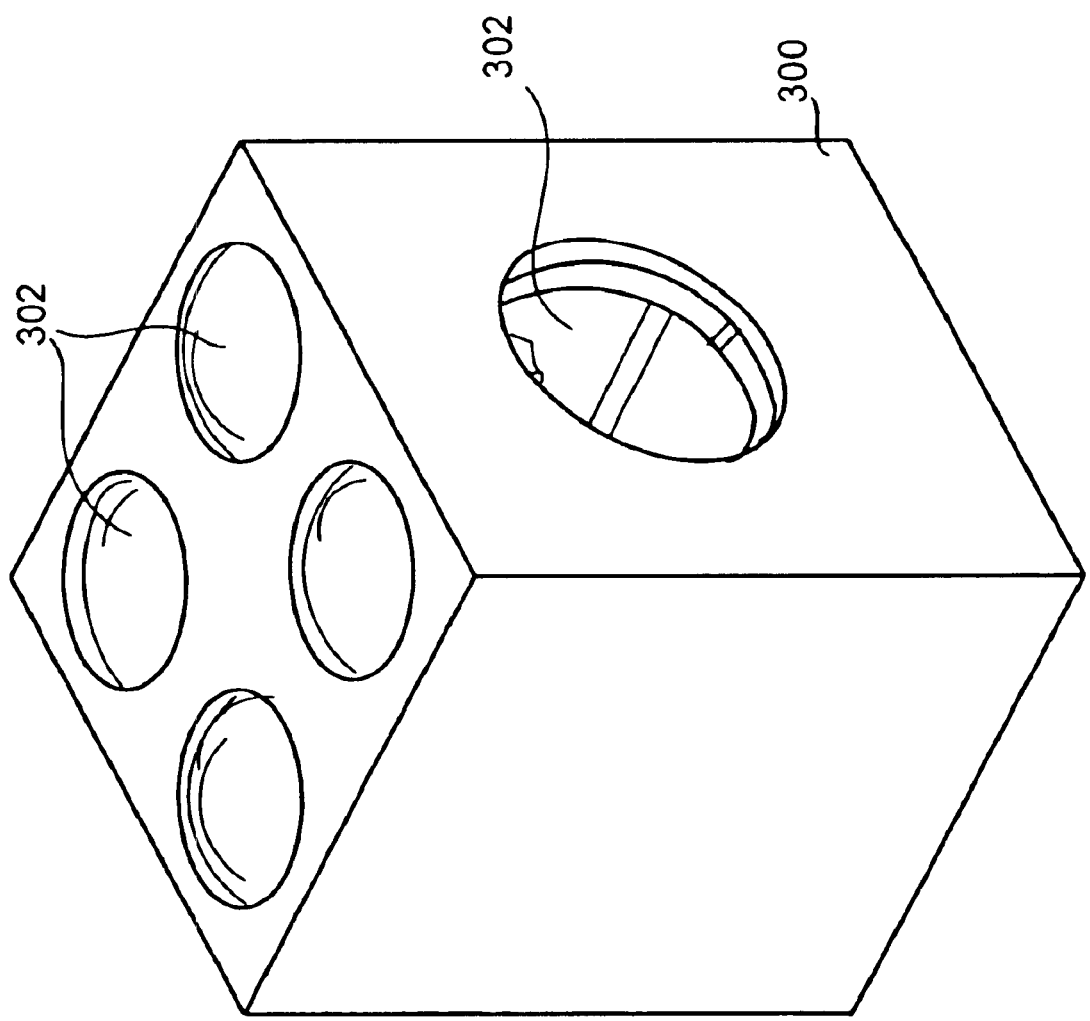
FIG. 7A is a schematic illustration of a long-range multi-directional case, constructed and operative in accordance with a further preferred embodiment of the present invention.
Figure 7C:
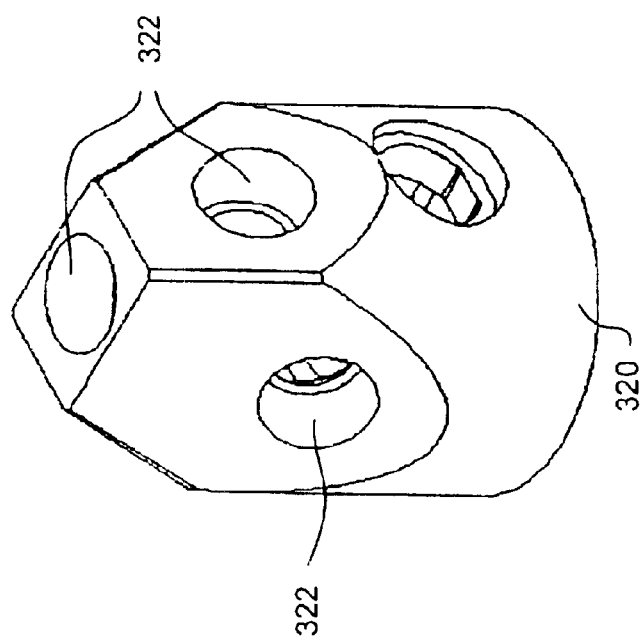
FIG. 7C is a schematic illustration of a medium-range omni-directional case, constructed and operative in accordance with a further preferred embodiment of the present invention.
Figure 7B:
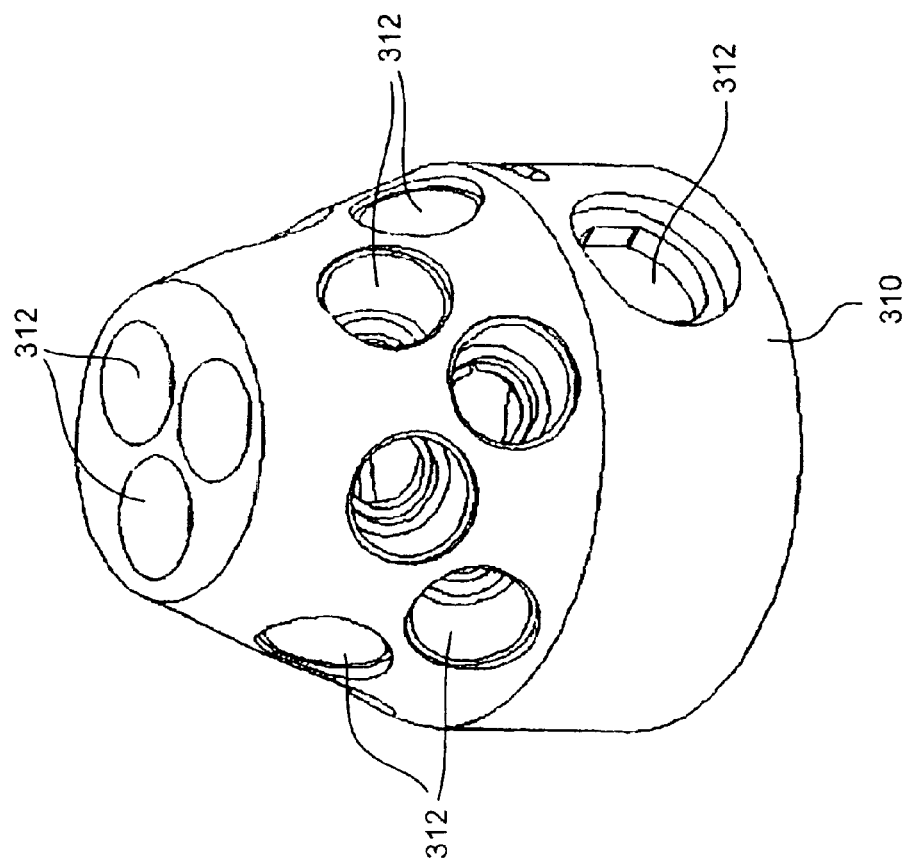
FIG. 7B is a schematic illustration of a long-range omni-directional case, constructed and operative in accordance with another preferred embodiment of the present invention.

Reference is further made to FIGS. 7A, 7B, and 7C. FIG. 7A is a schematic illustration of a long-range multi-directional case, generally referenced 300, constructed and operative in accordance with a further preferred embodiment of the present invention. FIG. 7B is a schematic illustration of a long-range omni-directional case, generally referenced 310, constructed and operative in accordance with another preferred embodiment of the present invention. FIG. 7C is a schematic illustration of a medium-range omni-directional case, generally referenced 320, constructed and operative in accordance with a further preferred embodiment of the present invention.

Cases 300, 310, and 320 have holes 302, 312, and 322, respectively, in which Infrared emitters are placed. Each of the cases 300, 310 and 320 can include four, fifteen and five infrared emitters, respectively, or any other number of infrared emitters. Cases 300, 310, and 320 can be made of any semi-rigid material, such as metal, ceramic plastic, and the like.

In the examples set forth in FIGS. 7A, 7B, and 7C, the cases 300, 310, and 320 are made of aluminum.

It will be appreciated by persons skilled in the art that the present invention is not limited to what has been particularly shown and described hereinabove. Rather the scope of the present invention is defined only by the claims, which follow.

What is claimed is:

1. Thermal radiation emitter controller for operating a thermal radiation emitter, comprising:
    a controller, connected to a power source; and
    a power amplifier connected to said controller, said power source and said thermal radiation emitter,
    said controller providing a pulse sequence to said power amplifier, said pulse sequence including a plurality of pulses, each said pulses heating up said thermal radiation emitter to a temperature respective of a wavelength, within the thermal radiation spectrum, said controller determining said pulse sequence according to an available power voltage level.

2. The emitter controller according to claim 1, further comprising a voltage regulator connected to said controller and to said power source, providing voltage regulated power to said controller.

3. The emitter controller according to claim 2, further comprising a voltage multiplier connected between said voltage regulator and said power source, said voltage multiplier receiving a power signal from said power source, multiplying the voltage level of said power signal by a predetermined factor and providing a voltage multiplied power signal to said voltage regulator.

4. The emitter controller according to claim 1, wherein said controller provides a power cut command to said power amplifier to cease operation of said emitter when said available power voltage level is lower than a predetermined minimal voltage level.

5. The thermal radiation emitter controller according to claim 1, further comprising an indicator connected to said controller, said power source and to said emitter, for indicating when power is provided to said thermal radiation emitter.

6. The emitter controller according to claim 5, wherein said indicator type is selected from the list consisting of:
    visual; and
    audible.

7. The emitter controller according to claim 1, wherein said power amplifier periodically heats said emitter.

8. Method for operating a thermal radiation emitter controller, comprising the steps of:
    detecting a voltage level of a power signal to be provided to a thermal radiation emitter connected to said thermal radiation emitter controller;
    determining a heating time period according to said detected voltage level, and a target heating temperature, said target heating temperature being within the thermal radiation spectrum; and
    producing a pulse signal according to said heating time period, for operating an amplifier connected between said thermal radiation emitter and said thermal radiation emitter controller, at said detected voltage level.

9. The method according to claim 8, further comprising the step of determining a cooling time period according to said target heating temperature and to the characteristics of said emitter.

10. The method according to claim 9, wherein said pulse signal is further produced according to said cooling time period.

11. The method according to claim 8, further comprising the step of emitting a periodic infrared radiation according to said pulse signal.

12. The method according to claim 10, further comprising the step of emitting a periodic infrared radiation according to said pulse signal.

13. The method according to claim 8, further comprising the step of determining said target heating temperature.

14. Thermal radiation emitter system comprising:
    a thermal radiation emitter;
    a controller, to be connected to a power source; and
    a power amplifier connected to said controller, said power source and said thermal radiation emitter,
    said controller providing a pulse sequence to said power amplifier, said pulse sequence including a plurality of pulses, each said pulses heating up said thermal radiation emitter to a temperature respective of a wavelength, within the thermal radiation spectrum, said controller determining said pulse sequence according to an available power voltage level.

15. The emitter system according to claim 14, further comprising a voltage regulator connected to said controller and to said power source, providing voltage regulated power to said controller.

16. The emitter system according to claim 15, further comprising a voltage multiplier connected between said voltage regulator and said power source, said voltage multiplier receiving a power signal from said power source, multiplying the voltage level of said power signal by a predetermined factor and providing a voltage multiplied power signal to said voltage regulator.

17. The emitter system according to claim 14, wherein said controller provides a power cut command to said power amplifier to cease operation of said infrared emitter when said available power voltage level is lower than a predetermined minimal voltage level.

18. The emitter controller according to claim 14, further comprising an indicator connected to said controller, said power source and to said infrared emitter, for indicating when power is provided to said thermal radiation emitter.

19. The emitter controller according to claim 18, wherein said indicator type is selected from the list consisting of:
    visual; and
    audible.

20. The emitter system according to claim 14, further comprising a power source connected to said controller and to said power amplifier.

21. The emitter system according to claim 16, further comprising a power source connected to said controller, said voltage multiplier and to said power amplifier.

22. The emitter system according to claim 14, wherein said infrared emitter comprises:

a reflective base;

two conductive poles, emerging from said reflective base, electrically insulated from said reflective base;

a high emissivity wire, electrically connected between said conductive poles, emitting infrared radiation when conducting electrical current provided through said conductive poles; and a housing, said reflective base including a reflective surface.

23. The emitter system according to claim 22, wherein said housing further includes a window, said reflective surface directs said infrared radiation toward said window.

24. The emitter system according to claim 22, wherein said high emissivity wire is made of a filament wire.

25. The emitter system according to claim 24, wherein said filament wire is of a length in the range of 0.20 inches and 0.60 inches.

26. The emitter system according to claim 24, wherein said filament wire is of a length of 0.40 inches.

27. The emitter system according to claim 24, wherein said filament wire is of a width in the range of 0.020 inches and 0.060 inches.

28. The emitter system according to claim 24, wherein said filament wire is of a thickness in the range of 0.00020 inches and 0.00060 inches.

29. The emitter system according to claim 22, wherein said high emissivity wire forms the shape of a helix.

30. The emitter system according to claim 29, wherein said high emissivity wire has a diameter in the range of 0.003 inches and 0.030 inches.

31. The emitter system according to claim 29, wherein said helix shape of said high emissivity wire includes a plurality of windings, the number of said windings being in the range of four windings and fifty windings.

32. The emitter system according to claim 23, wherein said window is made of a transparent material.

33. The emitter system according to claim 23, wherein said window is made of a semi-transparent material.

34. The emitter system according to claim 23, wherein said window is made of a material which is transparent to mid Infrared radiation.

35. The emitter system according to claim 23, wherein said window is made of a material which is transparent to Infrared radiation.

36. The emitter system according to claim 23, wherein said window is made of a material which is selected from the list consisting of:

germanium;

zinc;

zinc-selenide; and silicon.

37. The emitter system according to claim 23, wherein said window comprises a lens.

* * * * *